United States Patent
Björklund et al.

(10) Patent No.: US 7,865,043 B2
(45) Date of Patent: Jan. 4, 2011

(54) METHOD, APPARATUS, COMPUTER PROGRAM AND STORAGE MEDIUM FOR RECORDING A MOVEMENT OF A USER UNIT

(75) Inventors: Andreas Björklund, Lund (SE); Torbjörn Gärdenfors, Klagshamn (SE); Tomas Edsö, Lund (SE)

(73) Assignee: Anoto AB, Lund (SE)

( * ) Notice: Subject to any disclaimer, the term of this patent is extended or adjusted under 35 U.S.C. 154(b) by 994 days.

(21) Appl. No.: 10/582,996

(22) PCT Filed: Dec. 16, 2004

(86) PCT No.: PCT/SE2004/001906

§ 371 (c)(1),
(2), (4) Date: Jun. 14, 2006

(87) PCT Pub. No.: WO2005/059819

PCT Pub. Date: Jun. 30, 2005

(65) Prior Publication Data

US 2007/0115152 A1 May 24, 2007

Related U.S. Application Data

(60) Provisional application No. 60/529,627, filed on Dec. 16, 2003.

(30) Foreign Application Priority Data

Dec. 16, 2003 (SE) .................................... 0303370

(51) Int. Cl.
*G06K 9/20* (2006.01)
(52) U.S. Cl. ..................................... 382/312

(58) Field of Classification Search ......... 382/186–189, 382/312–315; 345/156–183; 341/1–6, 57; 178/18.01–19.05
See application file for complete search history.

(56) References Cited

U.S. PATENT DOCUMENTS 4,809,351 A 2/1989 Abramovitz et al.

(Continued)

FOREIGN PATENT DOCUMENTS

CN 1122925 5/1996

(Continued)

OTHER PUBLICATIONS

Office Action mailed Oct. 28, 2003, in co-pending U.S. Appl. No. 09/673,702 (7 pages).

(Continued)

*Primary Examiner*—Sherali Ishrat
(74) *Attorney, Agent, or Firm*—Finnegan, Henderson, Farabow, Garrett & Dunner LLP

(57) ABSTRACT

A position code is recorded by capturing a sequence of images while writing on the base with a user unit. The position code may be decoded to a sequence of absolute positions reflecting the movement of the user unit over the base. If the position code in any image is not sufficiently recorded, e.g. because it is obscured by other graphics on the base, the spatial relationship of the image to another image in the sequence is determined. If the position code in this other image in the image sequence is decodable to an absolute position, the absolute position of the image in which the position code is not decodable could nevertheless be determined by using the spatial relationship. In this way the movement of the user unit can be recorded even though the position code is obscured, which could be the case when the same printing ink is used for both the position code and other graphics on the base.

13 Claims, 8 Drawing Sheets

U.S. PATENT DOCUMENTS

| | | | |
|---|---|---|---|
| 4,812,828 A * | 3/1989 | Nishi et al. | 345/157 |
| 5,051,736 A | 9/1991 | Bennett et al. | |
| 5,179,368 A * | 1/1993 | Lippincott | 345/156 |
| 5,420,943 A | 5/1995 | Mak | |
| 5,477,012 A | 12/1995 | Sekendur | |
| 5,506,605 A | 4/1996 | Paley | |
| 5,581,637 A | 12/1996 | Cass et al. | |
| 5,581,783 A | 12/1996 | Ohashi | |
| 5,748,808 A | 5/1998 | Taguchi et al. | |
| 5,850,058 A | 12/1998 | Tano et al. | |
| 5,852,434 A * | 12/1998 | Sekendur | 345/179 |
| 5,994,710 A | 11/1999 | Knee et al. | |
| 5,995,084 A * | 11/1999 | Chan et al. | 345/173 |
| 6,044,165 A | 3/2000 | Perona et al. | |
| 6,097,376 A * | 8/2000 | Rothschild et al. | 345/180 |
| 6,151,015 A | 11/2000 | Badyal et al. | |
| 6,172,354 B1 | 1/2001 | Adan et al. | |
| 6,222,174 B1 | 4/2001 | Tullis et al. | |
| 6,256,016 B1 | 7/2001 | Piot et al. | |
| 6,281,882 B1 | 8/2001 | Gordon et al. | |
| 6,295,061 B1 | 9/2001 | Park et al. | |
| 6,433,780 B1 | 8/2002 | Gordon et al. | |
| 6,548,768 B1 | 4/2003 | Pettersson et al. | |
| 6,563,951 B2 | 5/2003 | Fåhraeus et al. | |
| 6,667,695 B2 | 12/2003 | Pettersson et al. | |
| 6,674,427 B1 | 1/2004 | Pettersson et al. | |
| 6,792,165 B1 * | 9/2004 | Silverbrook et al. | 382/314 |
| 6,898,334 B2 | 5/2005 | Sayers | |
| 6,985,643 B1 | 1/2006 | Fåhraeus et al. | |
| 2004/0135776 A1 | 7/2004 | Brouhon | |

FOREIGN PATENT DOCUMENTS

| | | |
|---|---|---|
| CN | 1359587 | 7/2002 |
| EP | 0 112 415 | 7/1984 |
| EP | 0 692 759 A2 | 1/1996 |
| EP | 0 767 443 B1 | 4/2002 |
| JP | 3-280177 | 12/1991 |
| JP | 6-098090 | 4/1994 |
| JP | 7-234755 | 9/1995 |
| JP | 8-107479 | 4/1996 |
| JP | 8-129443 | 5/1996 |
| JP | 10-11574 | 1/1998 |
| WO | WO 85/00683 | 2/1985 |
| WO | WO-92/17859 A1 | 10/1992 |
| WO | WO 97/37320 | 10/1997 |
| WO | WO 98/11528 | 3/1998 |
| WO | WO-98/20446 A1 | 5/1998 |
| WO | WO-99/36879 A1 | 7/1999 |
| WO | WO 99/60469 | 11/1999 |
| WO | WO-00/73983 A1 | 12/2000 |
| WO | WO 01/01670 A1 | 1/2001 |
| WO | WO-01/26033 A1 | 4/2001 |
| WO | WO-01/26034 A1 | 4/2001 |
| WO | WO-01/75779 A1 | 10/2001 |
| WO | WO-01/75783 A1 | 10/2001 |
| WO | WO-02/42989 A1 | 5/2002 |
| WO | WO-03/001440 A1 | 1/2003 |
| WO | WO-03/001441 A1 | 1/2003 |
| WO | WO-03/038741 A1 | 5/2003 |
| WO | WO-03/049023 A1 | 6/2003 |
| WO | WO-2004/097723 A1 | 11/2004 |

OTHER PUBLICATIONS

Office Action mailed May 19, 2004, in co-pending U.S. Appl. No. 09/673,702 (11 pages).

Office Action mailed Nov. 8, 2004, in co-pending U.S. Appl. No. 09/673,702 (14 pages).

Notice of Allowability mailed Jul. 27, 2005, in co-pending U.S. Appl. No. 09/673,702 (7 pages).

Office Action mailed Jan. 9, 2003, in co-pending U.S. Appl. No. 09/673,706 (11 pages).

Office Action dated Jun. 6, 2002, in co-pending U.S. Appl. No. 09/673,706 (9 pages).

Office Action from The Patent Office of the People's Republic of China, Application No. 20040040391.4, dated Mar. 14, 2008 (13 pages).

Office Action from the European Patent Office, Application No. 04 809 079.2210, dated Jan. 8, 2008 (4 pages).

International Preliminary Report on Patentability, Application No. PCT/SE2004/001906, dated Jun. 29, 2006 (7 pages).

Yoshihiro Okada, et al., "A Method for Document Digitizer by Real-Time Assembling of Mosaic Pictures", Systems-Computers-Controls, vol. 13, No. 5, 1982 (7 pages).

Abstract of Japanese Patent Publication No. 91/90277, Delphion Intellectual Property Network, 1997 (1 pages).

Translation of Japanese Official Action in Japanese Patent Application No. 2000-550018, dated Jan. 28, 2009 (2 pages).

* cited by examiner

A　　　　　　　　　　　　　　B

A　　　　　　　　　　　　　　B

```
----20----------
-----0110100----
-----0--31------
---030---1-1----
----211-3011----
--1--1--310--2--1
-----1-0033-----
--1--00-022120---
-2320-0121120
-00333212023-0--
0112110303031---
0020000103300---
-003321011201---
----11130311
-------00002----
----------------
```
A

```
---30--2--------
--1-00--01001---
--1----301--3---
--1--0-30-------
--1----21--3011-
-20--1---0-11-1
-2---------0310-
--1----0010221--
00112320101211--
1120003332120---
1202312110303---
0310020000103---
012220332101----
-----1311130----
--------0100----
----------------
```
B

METHOD, APPARATUS, COMPUTER PROGRAM AND STORAGE MEDIUM FOR RECORDING A MOVEMENT OF A USER UNIT

CROSS-REFERENCE TO RELATED APPLICATIONS

The present application claims the benefit of Swedish patent application No. 0303370-1 and U.S. provisional patent application No. 60/529,627, both of which were filed on Dec. 16, 2003, and both of which are hereby incorporated by reference.

FIELD OF THE INVENTION

The present invention generally relates to recording of a movement and, more specifically, to a method for recording a movement of a user unit over a base, which is provided with a position code. The recording of the movement may e.g. be carried out in order to electronically record handwritten information.

The invention also relates to an apparatus, a computer program and a storage medium which can be used for recording a movement.

BACKGROUND ART

It is known to digitize handwriting by determining the movement of a pen that is used for providing the handwriting. The movement may e.g. be determined by one or more accelerometers mounted to the pen. Another alternative is to use a base with a position code and to provide the pen with a sensor which records the position code locally at the tip of the pen during the pen's movement over the base. A processing unit, arranged in the pen or externally thereof, can then decode the position code to a series of position indications, e.g. coordinates, which reflects the pen's movement over the base.

WO 01/26033, U.S. Pat. No. 5,477,012, WO 00/73983 and WO 92/17859 disclose different examples of position codes that could be used for recording handwriting.

Moreover, WO 01/75779 discloses a form provided with a position code enabling digital recording of information written on the form. In addition to the position code, the base is here provided with a form layout, such as frames around entry fields and text indicating what information should be filled-in in the entry fields.

According to WO 01/75779, the form layout can be printed on the base simultaneously with the position code or in different runs. In order not to disturb the reading of the position code, different printing inks should be used for the form layout and the position code. The printing ink for the form layout should moreover be invisible for the sensor in the pen. If both the printing code and the form layout are printed with the same printing ink, the form layout may partly obscure the printing code, making it impossible to decode the position code in areas close to the form layout or in areas obscured by the form layout.

However, the use of different printing inks is unpractical. It would be more practical if the pen could be used on forms printed on blank papers by means of a monochrome printer, e.g. a monochrome laser printer.

SUMMARY OF THE INVENTION

One object of the invention is to make possible the determination of a movement of a user unit over a base which is provided with a position code when the position code is insufficiently recorded, e.g. because the position code is wholly or partly obscured by other graphics.

Another object of the invention is to make possible the determination of a movement of a user unit over a base that is provided with a position code and other graphics printed with the same printing ink.

One or more of these objects are at least partly achieved by a method, an apparatus, a computer program and a storage medium according to the independent claims.

According to a first aspect, the invention is a method of recording a movement of a user unit over a base, which is provided with a position code, comprising determining an absolute position of the user unit on the basis of the position code in at least one image in a sequence of images of the position code obtained during the movement of the user unit over the base; determining a spatial relationship between a first and a second image in the sequence; and determining another absolute position of the user unit on the basis of the first-mentioned spatial relationship between the first image and the second image.

The position code need thus not be decodeable in all the images in the recorded sequence in order to determine the movement of the user unit. If an absolute position of the user unit cannot be determined for a specific image, the user unit's position can as an alternative be determined based on the spatial relationship between two images in the sequence and a previously or later determined absolute position.

The steps of determining an absolute position of the user unit on the basis of the position code in at least one image and of determining av spatial relationship between a first image and a second image may thus be carried out in arbitrary order.

The first or second image may be the same image as the one for which the first mentioned-absolute position of the user unit is determined.

The second or the first image may be the same image as the one for which the other absolute position of the user unit is determined.

The first-mentioned absolute position of the user unit may be determined by decoding the position code in the image. Other methods may also be used as will appear from the following description.

When determining the first-mentioned absolute position of the user unit, the position code in two or more images can be used if the position code in one of the images is insufficient for enabling the decoding of an absolute position.

As is evident from above, the images are not always processed one by one to determine positions of the user unit, but at times a position is determined based on information from several images. The use of more than one image for decoding a position is here referred to as a distributed decoding.

Thus, the method could also be described as a method of recording a movement of a user unit over a base, which is provided with a position code, which method comprises recording a sequence of images, each of which corresponds to a partial area of the position code which is sufficiently large for allowing least one position to be decoded, and using information from more than one image for determining a user unit position.

The invention can be used in all situations where the position code of an image cannot be decoded for one or another reason. The reason for the inability to decode the position code need thus not be that the position code is partly obscured by other graphical information. The invention can also be used for instance when the position code is deformed or otherwise incorrect on the base so that decoding of an absolute position is impossible or when the position code is absent locally on the base.

If desired, the invention can of course also be used when the position code in every image is decodeable to an absolute image. There may e.g. be situations where the distributed decoding is faster and/or easier and/or more secure to carry out compared to the decoding of the position code in every image.

An absolute position should in this application be interpreted as a position defined without reference to other positions, e.g. a position defined by one or more absolute coordinates.

The first and second images may be any pair of images in the sequence. The first image may be located before or after the second image in the sequence. The sequence may include only images with overlapping contents, or some images with overlapping contents and some without, or only images without overlapping contents. The images of the sequence may have been recorded without the user unit having been lifted from the base during the recording. The user unit may also have been lifted from the base at one or more occasion during the recording and then put down on the base again.

The position code may define positions in one or more dimensions. The movement that is recorded may be a movement in one or more dimensions.

The determining of the spatial relationship may comprise determining the best overlap position between the first and second images. One way of doing this is to correlate content of at least the first and second images. The first and second images can be partly over-lapping. In this case at least part of the content of these images can be directly compared in order to establish their spatial relationship. They may, but need not, be successive images in the sequence.

Alternatively, the images are not overlapping, but they belong to a series of partly overlapping images so that their spatial relationship can be established by succesively determining the spatial relationship with intervening images in the sequence.

As yet another alternative, the first and second images do not have overlapping contents but the content is such that the spatial relationship can nevertheless be determined based on the contents of the images.

The images can be correlated in preprocessed or unpreprocessed format. The images can be e.g. binarized, in gray scale or in colour.

The correlation can be made on a pixel-level or on a higher level, e.g. on a feature level, where specific features in the images are compared. Each feature can be represented by a number of pixels. It can have a specific form. Part of a form layout or other graphical information on the base can be used as features. Handwriting made by ink from a user unit can also be used for feature correlation.

A position code usually consists of a plurality of symbols or marks, where each symbol codes a value, e.g. a binary value. The spatial relationship between two images can therefore also be determined based on the correlation of symbol values or values determined for groups of symbols.

The spatial relationship can e.g. be expressed or stored as a vector indicating the offset between the first and second images in one or two or more dimensions.

According to a second aspect, the invention concerns an apparatus which comprises a control unit, which is adapted to perform a method according to the first aspect.

The processing unit may e.g. be realized by a suitably programmed processor, by specifically adapted hardware, such as an ASIC (Application-Specific Integrated Circuit) or an FPGA (Field Programmable Gate Array), by digital or analog circuits or any combination thereof. The processing unit can reside in the same unit as the sensor that images the position code or in another unit.

According to a third aspect the invention concerns a computer program, which comprises program code that, when executed in a computer, causes the computer to carry out a method according to the first aspect.

The computer program can be stored on and distributed in the form of a storage medium, such as an electronic memory like RAM, SRAM, DRAM, SDRAM, ROM, PROM, EPROM, EEPROM, etc; an optical disk; a magnetic disk or tape; or some other commercially available storage medium.

Other objects, features and advantages of the invention are apparent from the following detailed description of the invention, from the appended claims and from the drawings.

Of course, features of the different embodiments of the invention may be combined in one and the same embodiment.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated otherwise.

BRIEF DESCRIPTION OF THE DRAWINGS

The invention will now be described in more detail with reference to the accompanying drawings.

FIGS. 10A and 10B show two dot value matrices generated from the images of FIGS. 9A and 9B.

DETAILED DESCRIPTION OF EXAMPLES OF THE INVENTION

Figure 1:
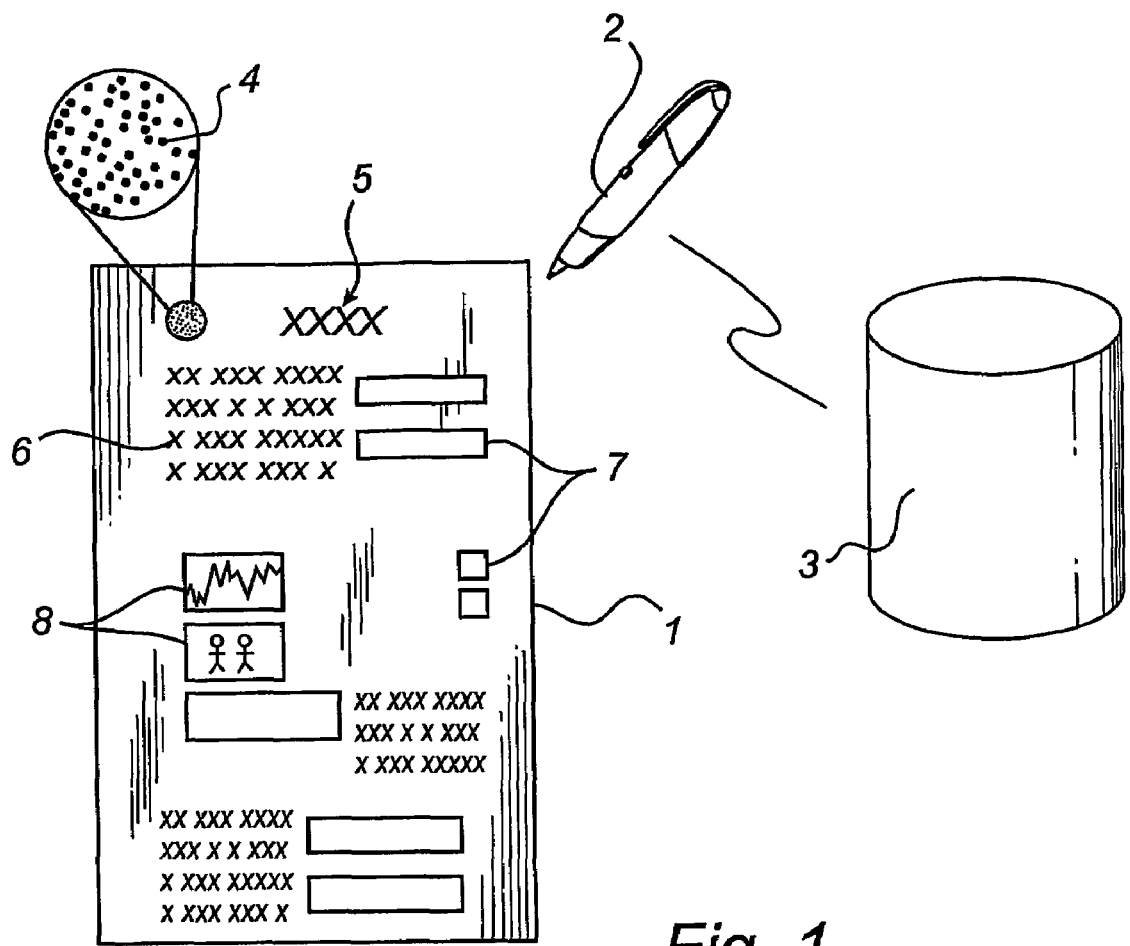
FIG. 1 is a schematic view of a system in which distributed decoding can be used.

FIG. 1 shows a system for information management, in which the present invention can be used. The system comprises a base 1 in the form of a sheet of paper, an apparatus for recording a movement in the form of a pen-style user unit 2, and an external unit 3. The sheet of paper constitutes a form. The entire sheet of paper may be provided with a position code 4, only a small part of which is schematically indicated in an enlarged scale, and a form layout 5, which here comprises text 6, boxes 7 to be filled-in and images 8. In this example, it is assumed that the position code and the form layout 5 are printed with the same printing ink or with different printing inks which are however both visible for the user unit. This may result in that the position code cannot be recorded in areas where it is obscured by the form layout.

The user unit 2 can be used to write on the sheet of paper 1 in the same way as with an ordinary pen and to simultaneously record what is being written in digital form by recording of its movement. To this end, the user unit 2 continuously during writing records images of the position code at the tip of the user unit 2. If the position code in each image is decoded to an absolute position, the resulting sequence of such decoded positions usually constitutes an accurate digital representation of the movement of the user unit 2 over the base and, thus of what is written on the base 1 and where.

The position decoding is carried out in the user unit 2 and/or the external unit 3, to which the recorded images can be sent automatically (on-line) or when commanded by the user. The external unit 3 may be a PC, a mobile phone, a PDA (Personal Digital Assistant), a server on the Internet or any other unit that has the capacity to carry out the position decoding. For the digitally recorded information to correctly reflect the user unit's movement over the sheet of paper, it is important that the position decoding be made as correctly and completely as possible.

The position code 4, which will be described in more detail below, is made up of symbols or marks, which are arranged or designed according to predetermined rules. If a partial area of the position code is correctly imaged, said partial area having a predetermined minimum size, the position of the partial area in the total position code can be determined unambiguously by means of one or more symbols in the imaged partial area and a predetermined decoding algorithm. The position can be obtained as a pair of coordinates in a Cartesian or another coordinate system.

The decoding may function well as long as the position code in the partial area is completely and correctly imaged. Under actual conditions, however, the user unit 2 sometimes cannot image the position code entirely correctly, for instance because of poor lighting conditions, or because of defects in the imaging system. Problems can also arise if the position code is not quite accurately reproduced on the base but has been deformed to some extent when being applied to the base.

If the position code contains redundant information, errors affecting a limited number of symbols can under certain conditions be corrected.

Furthermore, WO 03/038741, discloses a method for position decoding, where, in case of a decoding error, information determined from the partial area is compared or matched with information about how the position code is composed in a matching area close to a previously successfully decoded position. The best matching portion of the known matching area is selected, and a corresponding position is determined as the decoded position.

If, however, too large parts of the position code are deformed or missing, for instance because the position code is partly or totally obscured by a form layout printed with the same kind of printing ink as the position code, error correction or matching against the known composition of the position code will not be possible because too many symbols are missing or incorrect. Instead a distributed decoding may be used as explained in the following with reference to FIG. 2.

Figure 2:
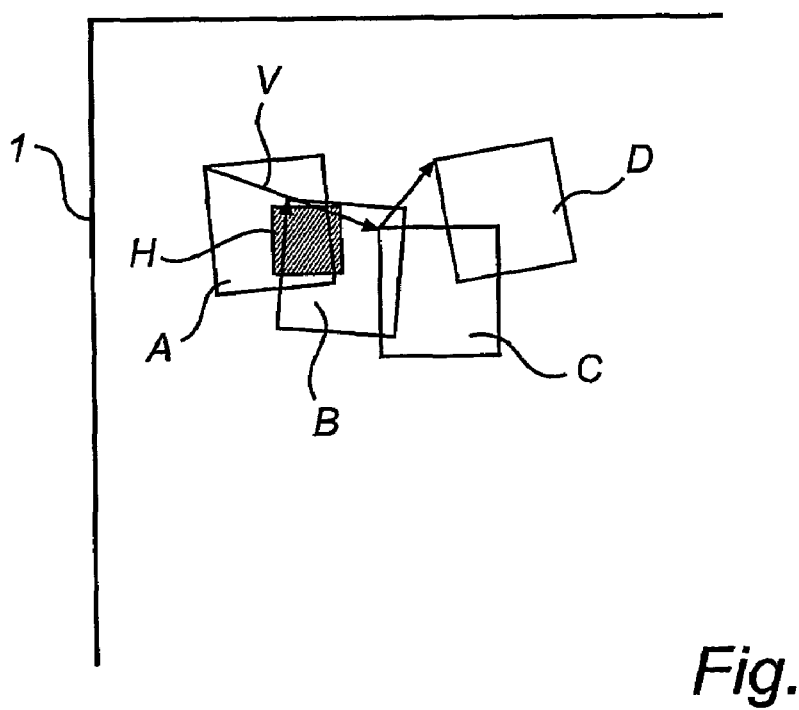
FIG. 2 is a schematic illustration of how a sequence of images is recorded from a base with a position code.

FIG. 2 schematically shows a small part of the base 1 of FIG. 1 but for the sake of clarity neither the position code, nor the form layout is shown on the base. When a pen stroke is made on the base, the user unit 2 simultaneously records images of the base locally at the tip of the user unit. FIG. 2 schematically shows an example of the positions in which four such images A-D are recorded. The images here form a sequence of partially overlapping images. Ideally, in this example, the position-code of each image is decoded to an absolute position indication, e.g. in the form of a pair of coordinates. However, if the position code is obscured this may not be possible. Assume e.g. that no absolute position can be decoded from the position code in image A. Then information from image A is saved. If no position can be determined for image B either, the best overlap position between images A and B is determined. Then it is checked whether the position code in image A and the position code in image B together can be decoded to an absolute position. Even if the position code in image A and image B taken alone cannot be decoded because it is obscured to a too large extent in the respective image, the combined position code from both images may be decodable to an absolute position. This is schematically illustrated in FIG. 2, with a hatched area H covering part of images A and B. If so, the user unit's absolute positions when recording image A and image B can be determined, since the spatial relationship between the two has been established.

If an absolute position cannot be decoded from the combination of images A and B, the spatial relationship between these images is saved, e.g. as a vector V reflecting the offset in two dimensions, e.g. the horizontal and vertical directions, between images A and B. The above procedure is repeated until an image or combination of images is found in which the position code is sufficiently completely and correctly imaged for an absolute position to be decoded. Assume e.g. that an absolute position can be decoded from the position code in image C. If the offset between images B and C is also determined, then the absolute positions of images A and B can be determined by successively subtracting the offset from the absolute position of the subsequent image in the sequence. If again an absolute position cannot be decoded from the position code in image D, the offset between images C and D is determined and the absolute position of image D determined by adding the offset to the absolute position decoded from the position code in image C.

Before explaining the distributed decoding in further detail, the position code and the user unit used in this example will be described in somewhat more detail with reference to FIGS. 3 and 4, and FIGS. 5 and 6, respectively. A still more comprehensive description of the position code could be found in WO 03/001440.

The position code is based on a number sequence which below is referred to as a difference number sequence. This difference number sequence has the property that if one takes an arbitrary partial sequence of a predetermined length, for instance a partial sequence with five difference numbers, this partial sequence always has an unambiguously determined location in the difference number sequence. In other words, it appears only once in the difference number sequence and can thus be used for position determination. A sequence having this property is sometimes called a DeBruijn sequence. More specifically, the difference number sequence "runs" along the x axis as well as along the y axis of the position code.

Figure 3:
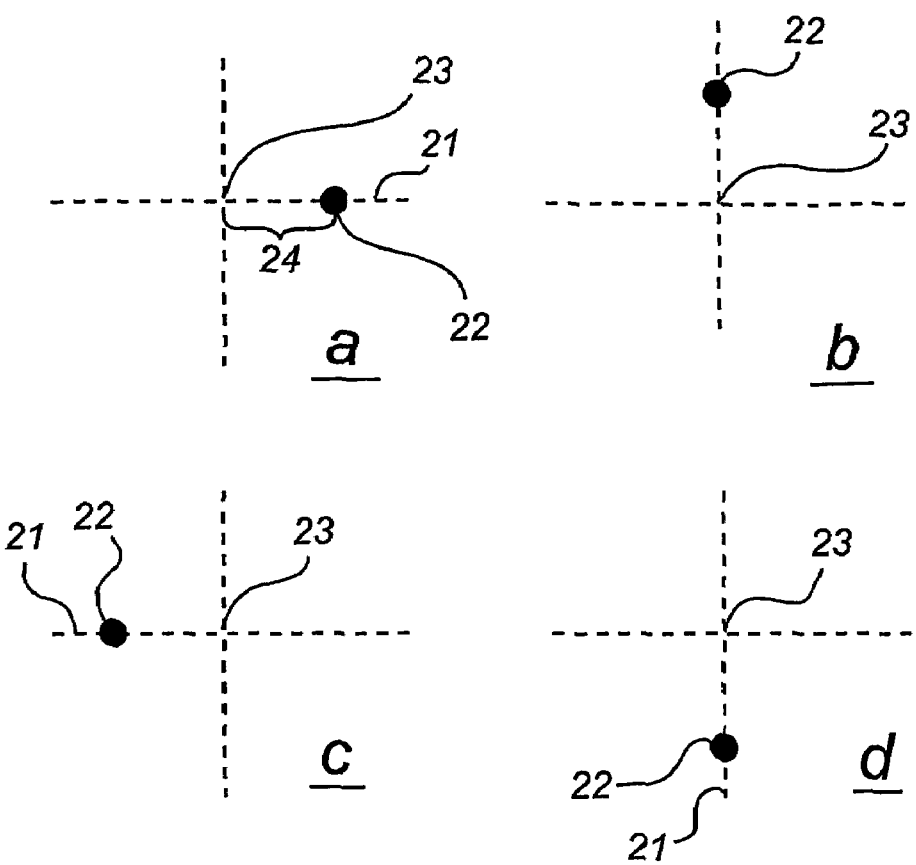
FIG. 3 shows four ideal locations of a mark in a position code.

The actual position code is made up of simple graphical symbols or marks 22 which can assume four different values, 0-3, depending on their respective position in relation to a nominal position 23 or raster point. As seen in FIG. 3, each symbol 22 has the shape of a dot and is displaced a distance 24 in one of four different directions relative to the nominal position 23. The nominal position 23 is at an intersection between raster lines 21 in a visible or invisible or virtual raster or grid. The value of the symbol is determined by the direction of the displacement. Each symbol value 0-3 can be converted into one bit which is used for coding an x coordinate and one bit which is used for coding a y coordinate, i.e. into the pairs of bits (0,0), (0,1), (1,0), and (1,1). Thus, the coding is made separately in the x direction and the y direction, but the graphical coding is made with a symbol which is common to the x and y bits.

It should be mentioned that the coding may for instance be as follow:

| Displacement | Bit pair (x, y) |
| --- | --- |
| Right | 0, 1 |
| Up | 0, 0 |
| Left | 1, 0 |
| Down | 1, 1 |

The distance 24 is suitably not less than about ⅛ and not more than about ¼, preferably about ⅙, of the distance between two adjacent raster lines 21. The distance can, for example, be about 300 micrometers or about 254 micrometers. The latter distance is particularly suitable for printers and scanners, which often have a resolution that is a multiple of 100 dpi (dots per inch). All the symbols of the position code are usually printed with one and the same printing ink so that the position code is monochrome.

Each position is coded by 6*6 symbols which can thus be converted into a 6*6 bit matrix for an x coordinate and a 6*6 bit matrix for a y coordinate for the position. If the x bit matrix is considered, this can be divided into six columns of six bits each. Each sequence of bits in a column constitutes a partial sequence in a 63-bit-long cyclic main number sequence which has the property that if a partial sequence having a length of six bits is selected, this has an unambiguously determined place in the main number sequence. The six columns can thus be converted into six position numbers or sequence values which correspond to six places in the main number sequence. Between these six position numbers, five difference numbers can be formed in neighboring pairs, which constitute a partial sequence of the difference number sequence and which thus have an unambiguously determined place in the same and, consequently, an unambiguously determined place along the x axis. For a certain x coordinate, the position numbers will vary depending on the y coordinate. On the other hand, the difference numbers will be the same independently of the y coordinate, since the position numbers always vary according to the main number sequence, which is repeated cyclically in the columns in the entire position-coding pattern.

Correspondingly, six rows in the y bit matrix define six position numbers in the main number sequence. These six position numbers define five difference numbers, which constitute a partial sequence of the difference number sequence and which thus have an unambiguously determined place along the y axis.

Figure 4:
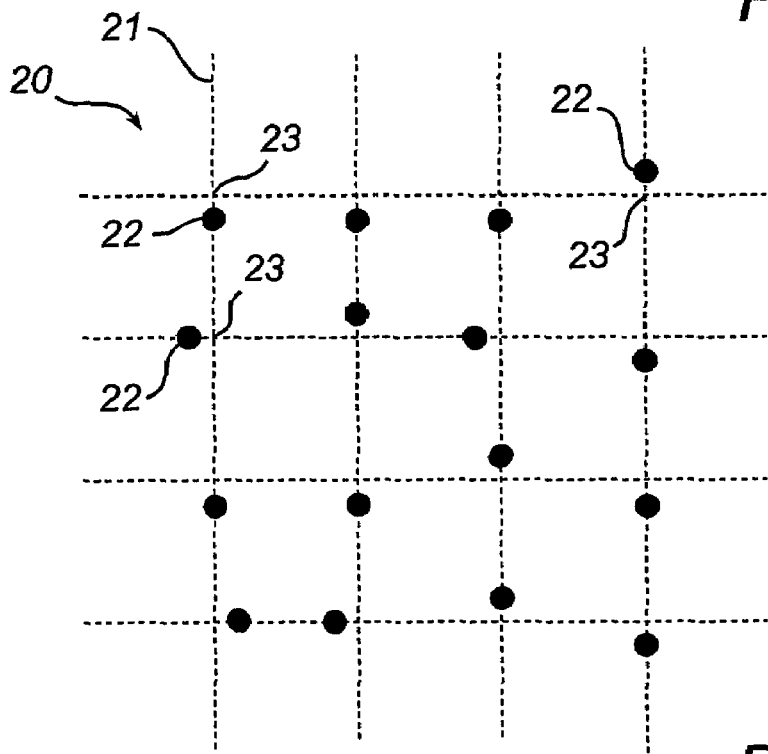
FIG. 4 is a schematic illustration of a position code which may be used for recording a movement of a user unit.

FIG. 4 shows a very small part of the position code with 4*4 symbols. The raster lines 21 are shown in the figure for illustration purposes only. In general, the raster is virtual.

When the position code is used, images of different parts of the position code are recorded, as has been described above. The images may contain considerably more than 6*6 symbols. Thus the position code may be decoded based on different sets of 6*6 symbols if a larger number of symbols are visible in the image. Surrounding symbols may also be used in the decoding, inter alia, for error detection and/or correction. The position code is of a so called "floating type". It means that any arbitrary partial area comprising a predetermined number of symbols, here 6*6 symbols, will define a position and that at least some of the symbols in the arbitrary partial area contribute to the coding of more than one position. Otherwise stated, if the arbitrary partial area is moved a symbol distance up, down, to the left or to the right, a new position will be defined by the symbols in the arbitrary partial area thus moved.

In the following, an example of how the user unit 2 of FIG. 1 may be realized will be described with reference to FIGS. 5 and 6. In this example, the user unit 2 comprises a casing or shell 2011 having approximately the same shape as a pen. In one short side of the casing there is an opening or window 2012 through which images are recorded.

The casing essentially contains a camera system, an electronic system, and a power supply.

The camera system 2014 comprises at least one illuminating light source, a lens and/or mirror arrangement and an optical image reader or image sensor (not shown in the Figure). The light source, suitably a light-emitting diode or a laser diode, illuminates a part of the area that can be viewed through the window 2012, by means of infrared radiation. An image of the viewed area is projected on the image sensor by means of the lens arrangement. The image sensor may be a light-sensitive area sensor, such as a CCD (Charge Coupled Device) or CMOS (Complementary Metal-Oxide Semiconductor) sensor, which may be triggered to record two-dimensional images at a fixed rate, typically of about 70-100 Hz. The sensor may be sensitive to infrared light. The sensor and the illuminating light source may be triggered in a synchronized fashion.

Generally speaking, the image sensor may be replaced by any kind of sensor that is suitable for imaging the position code so that an image of the symbols is obtained in black and white, in grey scale or in color. Such a sensor can be a solid-state single- or multi-chip device which is sensitive to electromagnetic radiation in any suitable wavelength range. For example, the sensor may include a CCD element, a CMOS element, or a CID element (Charge Injection Device). Alternatively, the sensor may include a magnetic sensor array for detection of a magnetic property of the marks. Still further, the sensor may be designed to form an image of any chemical, acoustic, magnetic, capacitive or inductive property of the marks.

The power supply to the user unit may be a battery 2015. The power supply may as an alternative or as a supplement be obtained via a cable from an external power source (not shown).

The electronic system comprises a control unit 2016 and a memory block 2013, to which the control unit is connected. The control unit is responsible for the different functions in the user unit, e.g. for the reading of images from the sensor and the carrying out of position decoding on the basis of these images. The control unit 2016 may be implemented by a commercially available microprocessor such as a CPU ("Central Processing Unit"), by a DSP ("Digital Signal Processor") or by some other programmable logical device, such as an FPGA ("Field Programmable Gate Array") or alternatively an ASIC ("Application-Specific Integrated Circuit"), discrete analog and digital components, or some combination of the above. The memory block 2013 comprises preferably different types of memory, such as a working memory (e.g. a RAM) and a program code and persistent storage memory (a non-volatile memory, e.g. flash memory). Associated software is stored in the memory block 2013 and is executed by the control unit 2016 in order to provide a user unit control system for the operation of the user unit.

The casing 2011 also carries a pen point 2017 which allows the user to write or draw physically on a surface by an ordinary pigment-based marking ink being deposited thereon. The marking ink in the pen point 2017 is suitably transparent to the illuminating radiation in order to avoid interference with the opto-electronic detection in the user unit. A contact sensor 2021 is operatively connected to the pen point 2017 to detect when the pen is applied to (pen down) and/or lifted from (pen up), and optionally to allow for determination of the application force. Based on the output of the contact sensor 2017, the camera system 2014 is controlled to capture images between a pen down and a pen up. The resulting sequence of temporally coherent positions forms an electronic representation of a pen stroke.

The pen point 2017 can be extendable and retractable, so that the user can control whether or not it is to be used. In certain applications, the user unit need not have a pen point at all.

The electronics system further comprises a communications interface 2019 for exposing data to a nearby or remote apparatus such as a computer, mobile telephone, PDA, network server, etc. The communications interface 2019 may thus provide components for wired or wireless short-range communication (e.g. USB, RS232, radio transmission, infrared transmission, ultrasound transmission, inductive coupling, etc), and/or components for wired or wireless remote communication, typically via a computer, telephone or satellite communications network.

The pen may also include an MMI 2020 (Man Machine Interface) which is selectively activated for user feedback. The MMI may include a display, an indicator lamp or LED, a vibrator, a speaker, etc.

Still further, the pen may include one or more buttons 2018 by means of which it can be activated and/or controlled.

The user unit can be divided into different physical casings. The sensor and other components that are necessary for capturing images of the position code and for transmitting them may be located in a first casing, while the components that are necessary for carrying out the position decoding may be located in a second casing.

Figure 5:
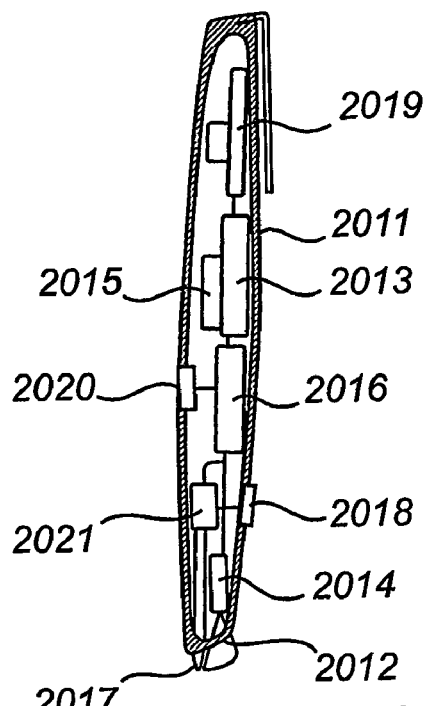
FIG. 5 is a schematic illustration of a user unit, in which the distributed decoding may be carried out.
Figure 6:
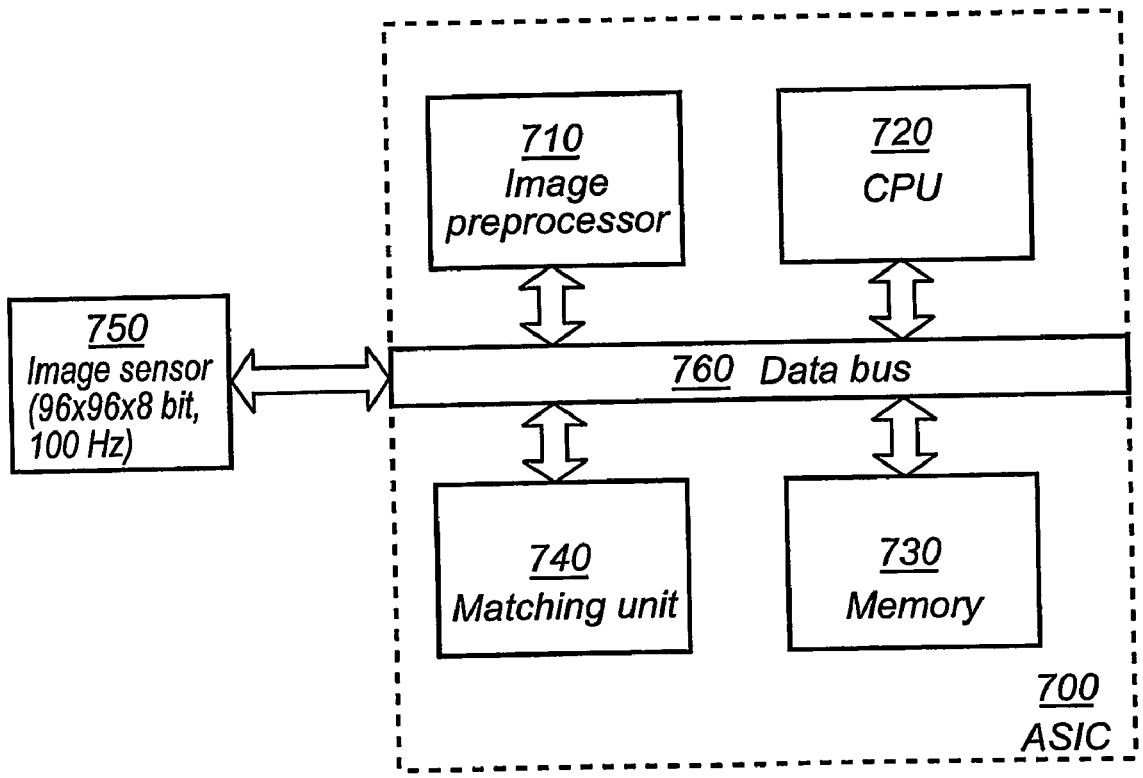
FIG. 6 is a schematic block diagram of an electronic circuitry part and an image sensor in the user unit shown in FIG. 5.
Figure 7:
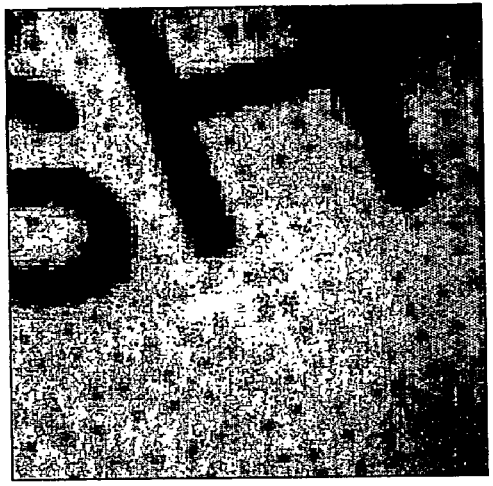
FIGS. 7A and 7B show two images of a form with a form layout that partially obscures the position code.
Figure 7:
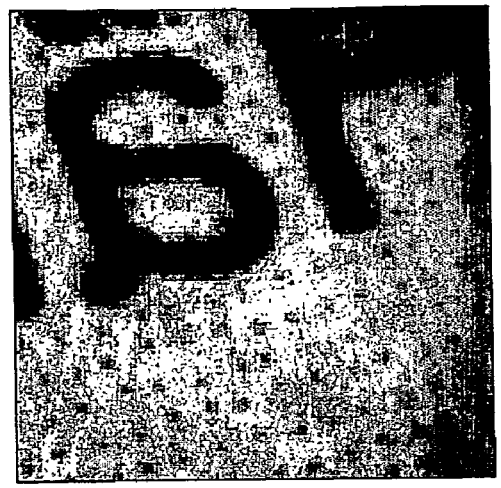
Figure 8:
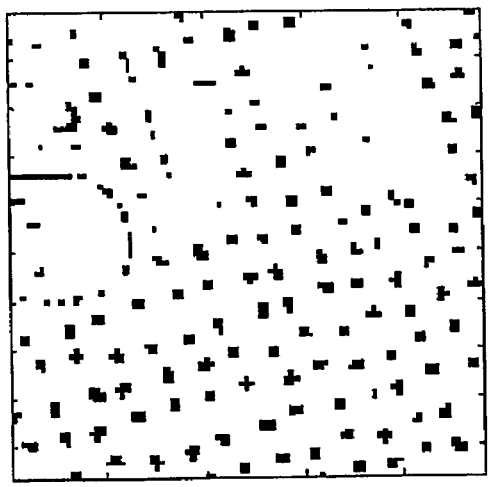
FIGS. 8A and 8B show the images of FIGS. 7A and 7B after preprocessing which includes binarization.
Figure 8:
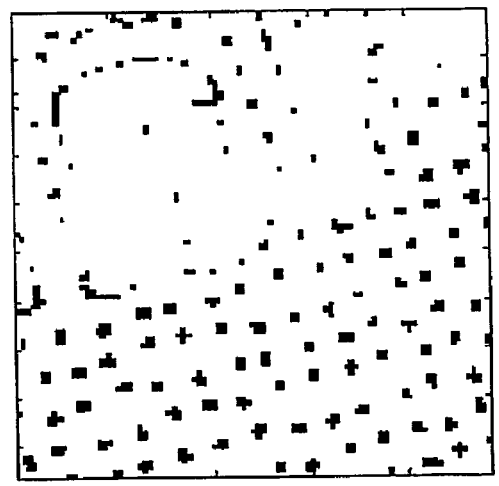
Figure 9:
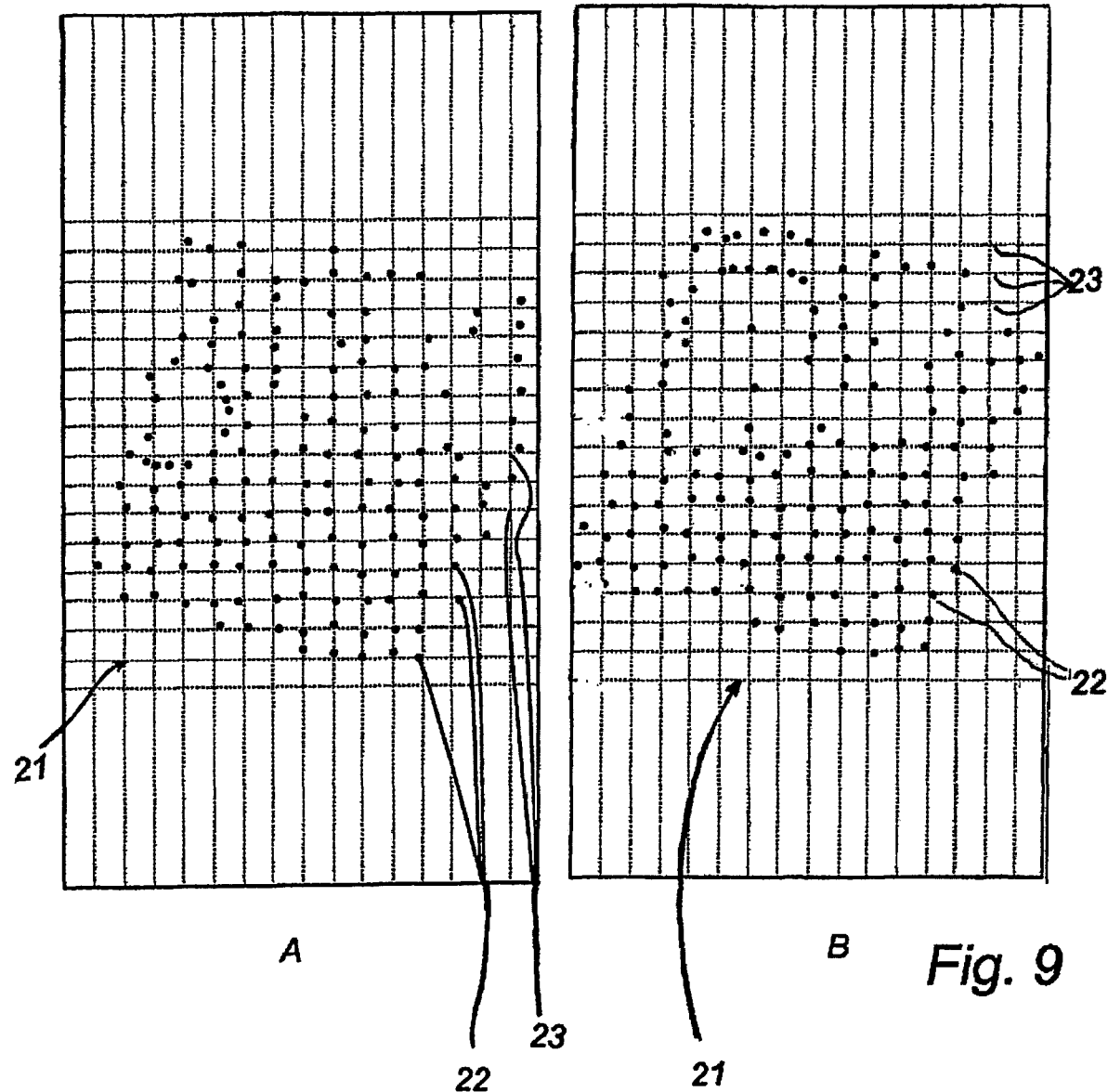
FIGS. 9A and 9B show the images of FIGS. 8A and 8B after dot localization, raster fitting and perspective correction.

FIG. 6 is a schematic block diagram of an example of an implementation of the control unit 2016, the memory block 2013 and the image sensor in the user unit shown in FIG. 5. An ASIC 700 contains a CPU 720 as a main controller of the electronic circuitry. The CPU 720 has access to a memory 730 through an on-chip data bus 760.

The image sensor is implemented as a CMOS area sensor 750, which is connected to the data bus 760 of ASIC 700 and which is capable of producing 96×96-bit, 256-level grayscale digital images at a frequency of 100 Hz. An image preprocessor 710 on ASIC 700 will preprocess images received from the image sensor 750 and may store the preprocessed images in memory 730 before decoding. The CPU 720 will perform the decoding of the position code in the preprocessed images into positions. A matching unit 740 may assist the CPU 720 in determining the spatial relationship between recorded images and/or in matching position code information in an image with previously known information about the position code in a limited region.

In the following, the decoding process will be explained more in detail with reference to FIGS. 7-13.

FIGS. 7-10 schematically and for illustration purposes only show how a pair of images may be processed. It should be understood that the images are normally processed substantially in sequence as is evident from the flowcharts of FIGS. 11 and 12.

Figures 10, 11:
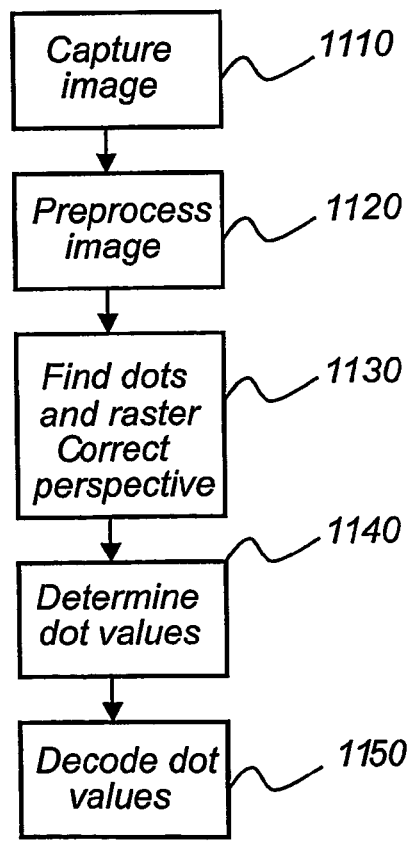
FIG. 11 is a flow chart illustrating an example of an overall decoding process.

During the writing by the user unit 2 on the base 1 in FIG. 1, the image sensor 2014 of user unit 2 captures images of the base, step 1110 in FIG. 11. The size of each captured image is at least the same as the partial area required for determining a position, but usually larger.

FIGS. 7A and 7B show two exemplary images captured in succession from a base having a position code with a plurality of dots and a form layout, which form layout in these images includes letters or parts thereof. It is evident that the images have overlapping contents and that the images are obtained as grayscale images.

Each captured image is preprocessed, step 1120, so as to form a suitable input for a following step 1130, in which the dots are localized, the virtual raster fit to the dots and the perspective corrected. In this connection, the perspective-corrected raster with the dots may be displaced so that a raster point is localized in the origin of the sensor coordinate system.

Steps 1120 and 1130 may be performed by way of techniques that are well known in the art, such as filtering, binarization or thresholding, and utilization of Fourier transforms. The raster may for instance be determined as described in WO 01/26034, WO01/75783 or WO 03/049023.

FIGS. 8A and 8B show the images of FIGS. 7A and 7B after preprocessing. The images are now in binary form. It is evident that the position code is missing in those parts of the images that correspond to the form layout in FIGS. 7A and 7B. The binarized images also comprise pixel formations that evidently do not pertain to the position code.

FIGS. 9A and 9B show the images of FIGS. 7A and 7B after step 1130, i.e. after the dots 22 have been localized and the virtual raster 21 fit thereto. Also, the perspective has been corrected so that the raster 21 is a square raster.

It should be mentioned that the perspective need not necessarily be corrected. The dot values can also be decoded from images with a non-corrected perspective, but by taking the perspective information into account. It is believed that the result will be better if the perspective is corrected and the dot values decoded from the perspective-corrected dot matrix.

The intersections of the raster lines constitute nominal positions 23 for the dots. If the position code is complete and correctly imaged, each nominal position 23 should have one associated dot, which is displaced in one of four directions from the nominal position 23 depending on which value it codes. In FIGS. 9A and 9B, some of the nominal positions 23 lack however an associated dot and other nominal positions have more than one associated dot. This may e.g. be due to obscuring form layout, imperfect imaging, imperfect preprocessing and/or imperfect dot localization.

In the following step 1140 a dot value is determined for each nominal point 23. Various methods can be used for this purpose.

For instance, if a nominal point 23 has only one associated dot, it may be investigated whether it lies within a certain "safe" zone around any of the four ideal displacement positions shown in FIG. 3. Such "safe" zones may e.g. be defined by circular areas having their centers at respective one of the four ideal displacement positions and having a predefined radius. Thus, if a dot is found to lie within any such "safe"

zone, the dot is held to have the value represented by the ideal displacement position that forms the center of the "safe" zone.

If no dot value can be determined for a nominal point because e.g. there is no dot associated with the point or because two dots are placed equally far from the ideal placement, the position is marked by a "-".

Alternatively, for each nominal position the probability that the associated dot(s) assume any of the four different possible dot values may be determined, e.g. as described in WO 03/001441. Then, probability threshold values may be applied, such that if a certain dot encodes any of the dot values 0-3 at a probability in excess of e.g. 0.8, where 0.8 is the threshold, then the dot is assigned that dot value, otherwise "-".

The determination of the dot values of the dots in FIGS. 9A and 9B results in the dot value matrices shown in FIGS. 10A and 10B, where 0-3 represent the dot values and "-" indicates that no dot value could be determined for the corresponding nominal position.

Each one of the dot value matrices of FIGS. 10A and 10B can also be separated into two bit matrices—one x matrix and one y matrix—by translating the dot values 0-3 to bit pairs 0,0; 0,1; 1,0; and 1,1, where the first bit is used in the x matrix for determination of an x coordinate and the second bit is used in the y matrix for determination of a y coordinate as described for instance in WO 01/26033.

Finally, the actual decoding of the dot value matrices in FIGS. 10A and 10B to absolute positions is carried out in step 1150. One way of carrying out this step will be described more in detail with reference to the flow chart in FIG. 12.

First, in step 1200, a New Image is retrieved for the decoding of the position information. The New Image is a captured image that has been processed as described above so that two bit matrices have been obtained. To simplify the description, these two matrices are however referred to as the New Image. In step 1205, it is determined whether it is possible to decode the position code in the New Image to an absolute position. If the position code is insufficiently recorded, for instance because it is partly or wholly obscured on the base, the New Image may not include sufficient information for allowing an absolute position to be decoded.

If the position code cannot be decoded, the spatial relationship or the relative position of the New Image with regard to a Previous Image is determined, step 1210, by way of correlation. If there is no Previous Image because the New Image is the first image, the process simply proceeds to the next step.

In the following step, step 1215, it is checked whether an absolute position is known, i.e. has been determined, for the Previous Image. If so, an absolute position is determined for the New Image, step 1225, using the relative position determined in step 1210, and stored as an absolute position of the New Image. If no absolute position is known, the relative position is just stored as a relative position of the New Image, step 1220, and the process proceeds to step 1270, where the New Image is set to be the Previous Image. However, if there is no Previous Image, there is evidently no known absolute position in step 1225 and no relative position to be stored in step 1220 and the process thus just proceeds to step 1270.

After step 1270, the process restarts in step 1200 with a New Image.

If, on the other hand, it is determined in step 1205 that the position code is decodable to an absolute position, then the decoding is carried out for the New Image in step 1230. In the following step 1235, it is checked whether the absolute position is known for the Previous Image, if any.

As is evident from above, the absolute position of the Previous Image can be known either from a decoding of the position code in the Previous Image or from a calculation based on the relative position.

If the absolute position is known, the decoded absolute position is simply stored in step 1240 as an absolute position of the New Image and the process proceeds to step 1270, after which it restarts in step 1200.

If, in the alternative, the absolute position is unknown, the New Image is correlated with the Previous Image, step 1245, in the same way as in step 1210. Thereafter, the absolute position for all previous images without a stored associated absolute position can be calculated using the stored relative position(s), step 1250.

It appears from above that if at the beginning of a pen stroke, the position code is insufficiently recorded in a series of images, then finally when an absolute position is decodable, it will be possible to go backwards and determining the absolute positions of the previous images.

Once, however, an absolute position has been determined for one image, the absolute position of every image with which a spatial relationship is determinable, can also be determined directly, either by decoding of the position code in the image or by comparison of at least part of its content with that of the previous image.

If an absolute position has been determined for two images and it has been impossible to determine a position for an image in between, the absolute positions of these two images can be used for estimating the position of the image in between, e.g. by interpolation.

The correlation in steps 1210 and 1245 can be carried out in different ways. One way is to correlate dot values of the dot value matrices or binary values of the x and/or y bit matrices by checking in which overlap position the highest number of dot values/binary values correspond. An advantage of this alternative is that the Previous Image could be stored in a relatively compact manner.

Another alternative would be to carry out the correlation on a still higher level. As previously explained, each sequence of bits in a column in a partial area of 6*6 symbols constitutes a partial sequence in a 63-bit-long cyclic main number sequence which has the property that if a partial sequence having a length of six bits is selected, this has an unambiguously determined place in the main number sequence. The six columns can thus be converted into six position numbers or sequence values which correspond to six places in the main number sequence. Thus, those columns in the x matrix that are sufficiently complete can be decoded to sequence values and the correlation can be carried out based on the sequence values. In the corresponding way, rows in the y matrix can be decoded to sequence values and correlation performed using these sequence values. Evidently, other groups of symbols, which could be decoded to a group symbol value could also be used for correlation.

A further alternative would be to correlate the Previous Image and the New Image in the preprocessed and binarised form, but before conversion to a dot value matrix or to binary value matrices. This comparison could be carried out in a well-known way by calculating a score based on the number of overlapping pixels in different overlap positions. Examples of methods that can be used for pixel-wise correlation are disclosed in e.g. WO 98/20446 and WO 99/36879.

Yet another alternative would be to correlate the images as they appear before preprocessing, e.g. in grayscale form.

Still another alternative would be to correlate the images using distinct features in the images, for instance the form layout in FIGS. 7A and 7B.

Suitable correlation techniques for grayscale and feature correlation are well-known to the skilled person and include e.g. Sum of Square Errors and Sum of Absolute Differences.

If the user unit comprises a pen point which outputs writing ink that is visible to the image sensor of the user unit, correlation can be carried out on the basis of handwriting that appears in the images.

If the Previous Image and the Next Image are correlated on the basis of the dot values, the following correlation formula f(u,v) could be used:

$$f(u, v) = \frac{\sum_{x,y} I(im1(x, y), im2(x + u, y + v))}{(\text{width} - |u|)(\text{height} - |v|)},$$

where I(a,b) is the equality function evaluating to 1 if a=b and 0 otherwise, im 1 is the Previous Image, im 2 is the New Image, width is the width of the images, height is the height of the images, u and v are the elements of the translational vector which indicates the overlap position, and x and y are pixel coordinates.

Figure 13:
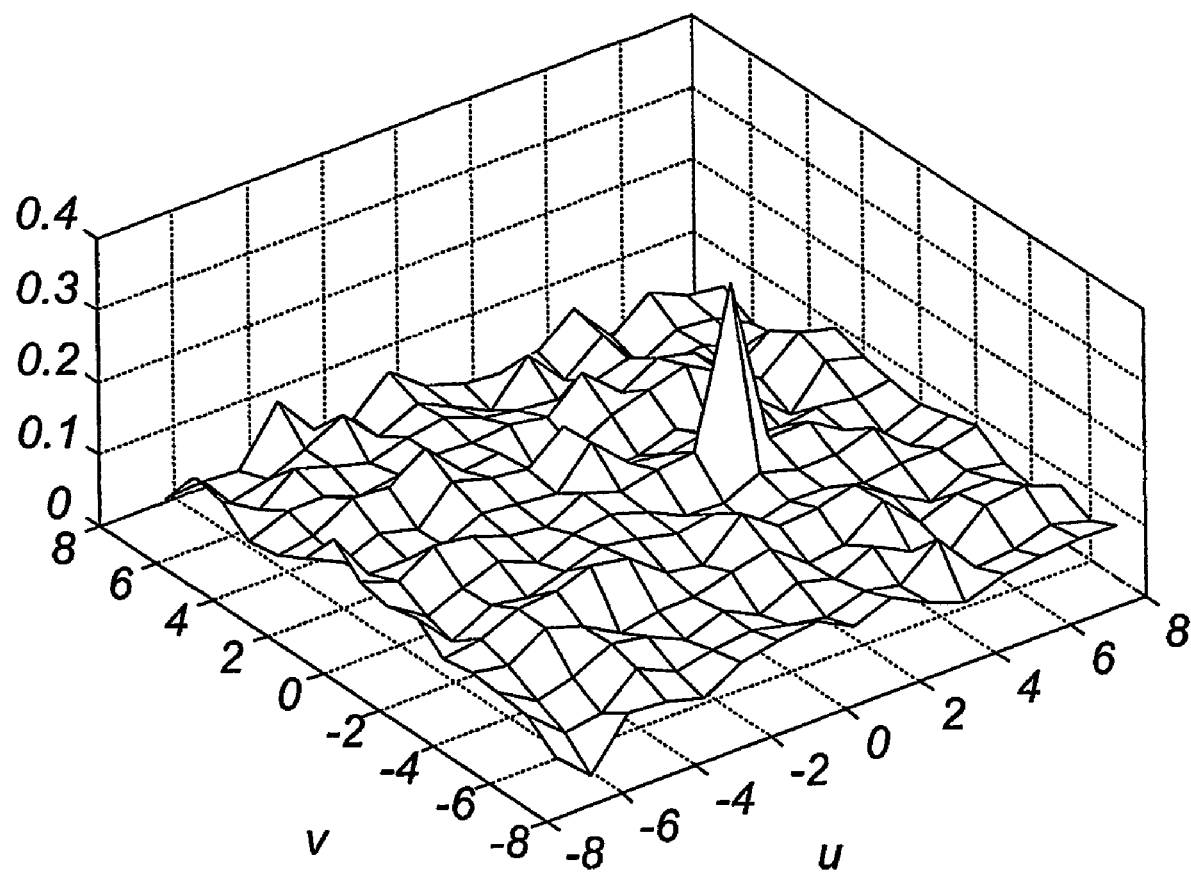
FIG. 13 is a diagram which shows the result of the correlation of the dot value matrices of FIGS. 10A and 10B.

FIG. 13 is a diagram which shows the result of the correlation of the dot value matrices in FIGS. 10A and 10B. In the diagram, u and v are the elements of the translational vector and z indicates a correlation measure. The peak in the diagram indicates that the New Image is translated by a vector (3,0) relative to the Previous Image. However, when the spatial relationship between the Previous Image and the New Image is determined, the possible displacement of the perspective-corrected raster in order to have a raster point in the origin of the sensor coordinate system may have to be taken into consideration.

The invention has been illustrated above by means of an example of a specific position code including dots that are displaced from nominal positions in a raster.

However, the distributed decoding could equally well be applied in connection with other types of position codes. It could, e.g. be used for position codes which code each position with a single, more complex symbol, like the position code in U.S. Pat. No. 5,477,012, for other position codes which code each position with a plurality of symbols but in a non-floating manner, or for other position codes of floating type, like WO 00/73983 or for any other position code.

The invention has furthermore been illustrated with a sequence of overlapping images. As indicated above, a spatial relationship between two images in a sequence of images can sometimes be determined even though there is no overlapping content. Instead the spatial relationship may be determined on the basis of the contents of the images. The position code used in the example above is based on cyclical main number series, which are repeated in columns and rows. If, for instance, the user unit is moved in the horizontal direction over the position code and two non-overlapping images are captured, one after the other, and if the distance between the images is equal to or less than half the length of the cyclical main number series in any of the two possible directions, then the spatial relationship can be determined from a comparison of the contents of the images and from the knowledge about the cyclical main number series. This is of course just but an example.

The decoding example described with reference to the flowchart of FIG. 12 can be expanded. After the correlation step 1210, a check may e.g. be carried out as to whether the combined position codes of the New Image and the Previous Image are decodable to an absolute position. If not, the process continues as shown with step 1215. If however an absolute position can be decoded, the absolute position of the New Image is determined and stored. If no absolute position is known for the Previous Image, its absolute position is also determined and stored. Then the New Image is set to the Previous Image in step 1270.

As has been mentioned above, an image may contain several sets of symbols enabling the determination of several different positions. However, the position of an image or of the user unit when the image was recorded is always defined in relation to a specific reference point in the coordinate system of the user unit sensor, e.g. the upper left corner. It should thus be understood that when it is indicated above that an absolute position is stored for an image, it is the absolute position of the reference point that is stored. If the absolute position of another point in the sensor coordinate system has been determined, the absolute position of the reference point can easily be calculated.

In the examples above, information from the Previous and the New Image is used. However, further images in the sequence can be stored and used in combination when carrying out the distributed decoding.

The determination of an absolute position from one or more images, without using any spatial relationship, can be carried out by calculating an absolute position from the decoded values of a set of dots, as is further disclosed in e.g. U.S. Pat. No. 6,674,427 and U.S. Pat. No. 6,667,695, which are hereby incorporated by reference. An absolute position may also be determined by predicting, from a known absolute position of the user unit, the next position of the user unit and by matching the predicted position of the user unit with information about how the position code is constructed in the neighborhood of the predicted position, as is further described in WO04/097723, which is hereby incorporated by reference.

Figure 12:
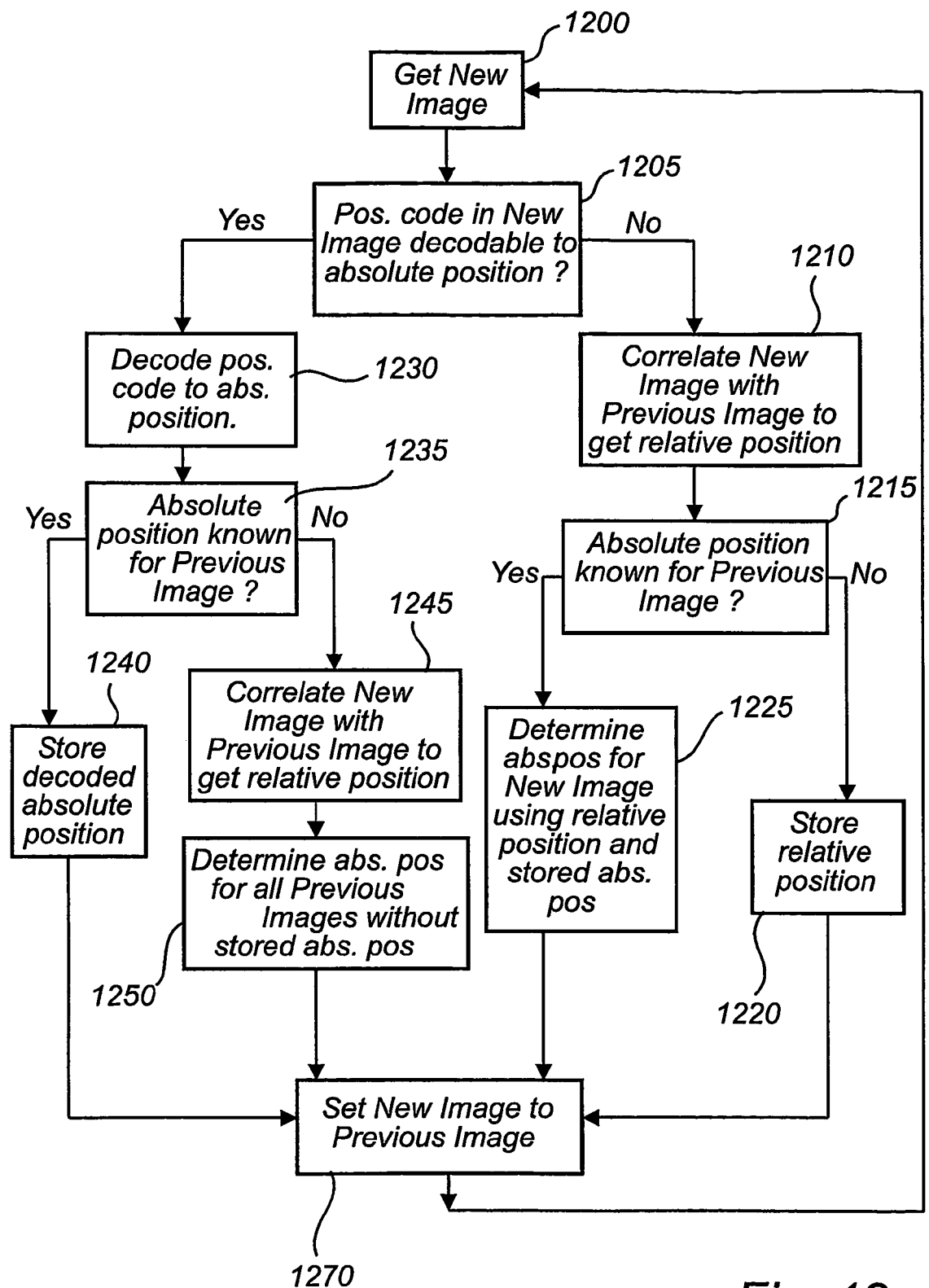
FIG. 12 is a flowchart illustrating how the distributed decoding according to the invention may be realized.

In the example of FIG. 12, the spatial relationship between a first and second image is determined only if the absolute position of the first image is not known. However, according to a variant, the spatial relationship between two successive images is always determined, the information being used when needed. No specific decision on whether or not to determine the spatial relationship need to be taken.

A purpose of the distributed decoding is to obtain one position for each image in the image sequence. However, there could be images for which no absolute position can be decoded from the position code and for which no spatial relationship to another image can be established. For such images a position may instead be determined e.g. by interpolation or extrapolation. Else it could be decided not to record any position for such an image. There could also be other situations where it is decided not to record any position for an image.

Thus a continuous movement of a user unit over a base is recorded by means of a sequence of images of a position code on the base. For some of the images the position code is directly decoded to absolute positions of the user unit, for other images their spatial relationship to a previous or subsequent image is determined and user unit positions determined there from.

The invention claimed is:

1. A method of recording a movement of a user unit over a base, which is provided with a position code, comprising
   determining an absolute position of the user unit on the basis of the position code in at least one image in a sequence of images of the position code obtained during the movement of the user unit over the base;
   determining a spatial relationship between a first and a second image in the sequence; and determining another absolute position of the user unit on the basis of the first-mentioned absolute position and the spatial relationship between the first image and the second image.

2. The method as claimed in claim 1, wherein determining the first-mentioned absolute position of the user unit comprises decoding the position code in said at least one image.

3. The method as claimed in claim 1, wherein determining the first-mentioned absolute position of the user unit comprises decoding position code from at least two images in the sequence.

4. The method as claimed in claim 1, wherein the determining of the spatial relationship comprises correlating content of the first and second images.

5. The method as claimed in claim 1, wherein the determining of the spatial relationship comprises correlating features of the first and second images.

6. The method as claimed in claim 1, wherein the determining of the spatial relationship comprises correlating position code information in the first and second images.

7. The method as claimed in claim 6, wherein the position code on the base comprises a plurality of symbols, each of which represents a symbol value, and wherein the determining of the spatial relationship comprises determining and correlating symbol values in the first and second images.

8. The method as claimed in claim 6, wherein the position code on the base comprises at least one group of symbols, which codes a group symbol value, and wherein the determining of the spatial relationship comprises determining and correlating group symbol values in at least the first and second images.

9. The method as claimed in claim 1, wherein the base, in addition to the position code, is provided with graphical information, which partly obscures the position code.

10. The method as claimed in claim 1, wherein the position code comprises a plurality of symbols, each of which is displaced in relation to a nominal position defined by an intersection of raster lines in a regular raster.

11. The method as claimed in claim 1, wherein the sequence of images comprises images with overlapping content.

12. An apparatus for recording a movement of a user unit over a base, which is provided with a position code, comprising a control unit that performs a method of recording a movement of a user unit over a base, which is provided with a position code, the method comprising:
   determining an absolute position of the user unit on the basis of the position code in at least one image in a sequence of images of the position code obtained during the movement of the user unit over the base;
   determining a spatial relationship between a first and a second image in the sequence; and
   determining another absolute position of the user unit on the basis of the first- mentioned absolute position and the spatial relationship between the first image and the second image.

13. A non-transitory computer-readable storage medium on which is stored a computer program which, when executed in a computer, causes the computer to carry out a method of recording a movement of a user unit over a base, which is provided with a position code, the method comprising:
   determining an absolute position of the user unit on the basis of the position code in at least one image in a sequence of images of the position code obtained during the movement of the user unit over the base;
   determining a spatial relationship between a first and a second image in the sequence; and
   determining another absolute position of the user unit on the basis of the first-mentioned absolute position and the spatial relationship between the first image and the second image.

* * * * *